(12) United States Patent
Nguyen

(10) Patent No.: US 11,536,836 B2
(45) Date of Patent: Dec. 27, 2022

(54) TIME-OF-FLIGHT INDEPENDENT OF OBJECT REFLECTIVITY

(71) Applicant: Sensors Unlimited, Inc., Princeton, NJ (US)

(72) Inventor: Thuc-Uyen Nguyen, Princeton, NJ (US)

(73) Assignee: Sensors Unlimited, Inc., Princeton, NJ (US)

( * ) Notice: Subject to any disclaimer, the term of this patent is extended or adjusted under 35 U.S.C. 154(b) by 678 days.

(21) Appl. No.: 16/585,293

(22) Filed: Sep. 27, 2019

(65) Prior Publication Data
US 2021/0096251 A1 Apr. 1, 2021

(51) Int. Cl.
G01S 17/10 (2020.01)
G01S 7/48 (2006.01)
G01S 7/4865 (2020.01)

(52) U.S. Cl.
CPC ............ *G01S 17/10* (2013.01); *G01S 7/4808* (2013.01); *G01S 7/4865* (2013.01)

(58) Field of Classification Search
CPC ................................ G01S 17/10; G01S 7/4808
See application file for complete search history.

(56) References Cited

U.S. PATENT DOCUMENTS

| 5,541,723 | A | 7/1996 | Tanaka |
| 8,983,233 | B2 | 3/2015 | Katz et al. |
| 9,945,948 | B2 | 4/2018 | Yang et al. |
| 10,215,857 | B2 | 2/2019 | Oggier et al. |
| 2016/0209498 | A1* | 7/2016 | Kanter ............... G01S 7/487 |
| 2017/0254883 | A1 | 9/2017 | Hamel et al. |
| 2020/0400819 | A1* | 12/2020 | Yin .................. G01S 7/4861 |

FOREIGN PATENT DOCUMENTS

DE    10 2014 117097 B3    1/2016

OTHER PUBLICATIONS

Extended European Search Report dated Feb. 15, 2021, issued during the prosecution of European Patent Application No. EP 20198341.8.

* cited by examiner

*Primary Examiner* — Minh Q Phan
(74) *Attorney, Agent, or Firm* — Locke Lord LLP; Joshua L. Jones; Scott D. Wofsy

(57) ABSTRACT

A method includes flashing an object with a first illumination pulse at a first illumination power level, flashing the object with a second illumination pulse at a second illumination power level different from the first illumination power level, integrating at least a portion of a first return pulse which is the first illumination plus returning from the object to determine a first return time, and integrating at least a portion of a second return pulse which is the second illumination pulse returning from the object to determine a second return time. The method includes using the first and second return times to determine distance to the object independent of reflectivity of the object.

13 Claims, 3 Drawing Sheets

TIME-OF-FLIGHT INDEPENDENT OF OBJECT REFLECTIVITY

STATEMENT REGARDING FEDERALLY SPONSORED RESEARCH OR DEVELOPMENT

This invention was made with government support under contract number 40010791 awarded by the NIGHT VISION LAB AND ELECTRONIC SENSOR DIRECTORATE (US ARMY). The government has certain rights in the invention.

BACKGROUND

1. Field

The present disclosure relates to imaging, and more particularly to time of flight imaging such as in range finder and LIDAR systems.

2. Description of Related Art

In flash time-of-flight (ToF) depth sensing applications, the depth or range information is calculated based on the traveled time of a light pulse. As the retuned pulse is integrated and exceeds a threshold value, a receiving pixel will mark the receipt of the returned light. Objects of unknown reflectivity can significantly undermine the system's depth accuracy. A more reflective object appears to be closer than a less reflective object at the same distance.

The conventional techniques have been considered satisfactory for their intended purpose. However, there is an ever present need for improved systems and methods for time-of-flight determinations. This disclosure provides a solution for this need.

SUMMARY

A method includes flashing an object with a first illumination pulse at a first illumination power level, flashing the object with a second illumination pulse at a second illumination power level different from the first illumination power level, integrating at least a portion of a first return pulse which is the first illumination plus returning from the object to determine a first return time, and integrating at least a portion of a second return pulse which is the second illumination pulse returning from the object to determine a second return time. The method includes using the first and second return times to determine distance to the object independent of reflectivity of the object.

Using the temporal difference to determine the distance to the object can include using a look up table (LUT) to correlate the first and second return times to distance to the object. The LUT can be limited to an operational space such as an operation space ranging from 5 meters to 10 meters. The second illumination power level can be 80% of the first illumination power level. The first and second illumination pulses can each conform to a Gaussian temporal profile. Using the LUT can include using two sub-tables, one for each pulse, wherein each sub-table correlates respective measured travel time to predetermined actual travel times, and wherein using the LUT includes locating predetermined actual travel times in each of the sub-tables that closest match each other, which actual travel time can be used for calculating actual distance to the object. The method can include updating distance to the object by repeating flashing the object with the first and second illumination sources, integrating the first and second return pulses, determining the temporal difference, and determining distance to the object.

A system includes an illuminator configured to flash a scene with two different levels of illumination power and a sensor that is sensitive to illumination from the illuminator. A controller is operatively connected to the illuminator and to the sensor. The controller is configured to use the sensor and the illuminator at two different levels of illumination power to find range to an object independent of reflectivity of the object. The controller can include machine readable instructions configured to use the illuminator and sensor to implement methods as disclosed above.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
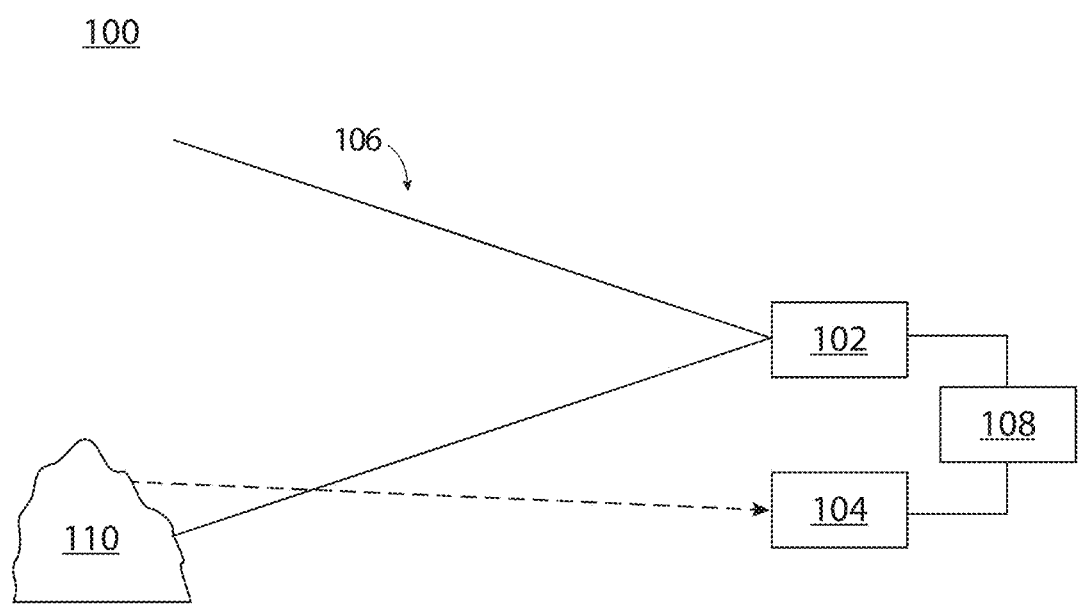
FIG. 1 is a schematic perspective view of an embodiment of a system constructed in accordance with the present disclosure, showing the illuminator, sensor, and controller.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to find range to an object, such as in laser range finding or LIDAR (Light Detection and Ranging), that is independent the object's reflectivity.

The system 100 includes an illuminator 102 configured to flash a scene with two different levels of illumination power. The flash cone 106 in FIG. 2 indicates the illumination from the illuminator 102. The system 100 also includes a sensor 104 that is sensitive to illumination from the illuminator 102. As indicated by the dashed line in FIG. 1, the sensor can detect a return of a pulse of illumination from the illuminator 102 that is reflected off of an object 110. The timing of the return of the reflected pulse is used to determine rage between the object 110 and the system 100. A controller 108 is operatively connected to the illuminator 102 and to the sensor 104. The controller 108 is configured to use the sensor 104 and the illuminator 102 at two different levels of illumination power to find range to an object 110 independent of reflectivity of the object 110. The controller 108 can include machine readable instructions configured to use the illuminator 102 and sensor 104 to implement methods as disclosed herein.

Figure 2:
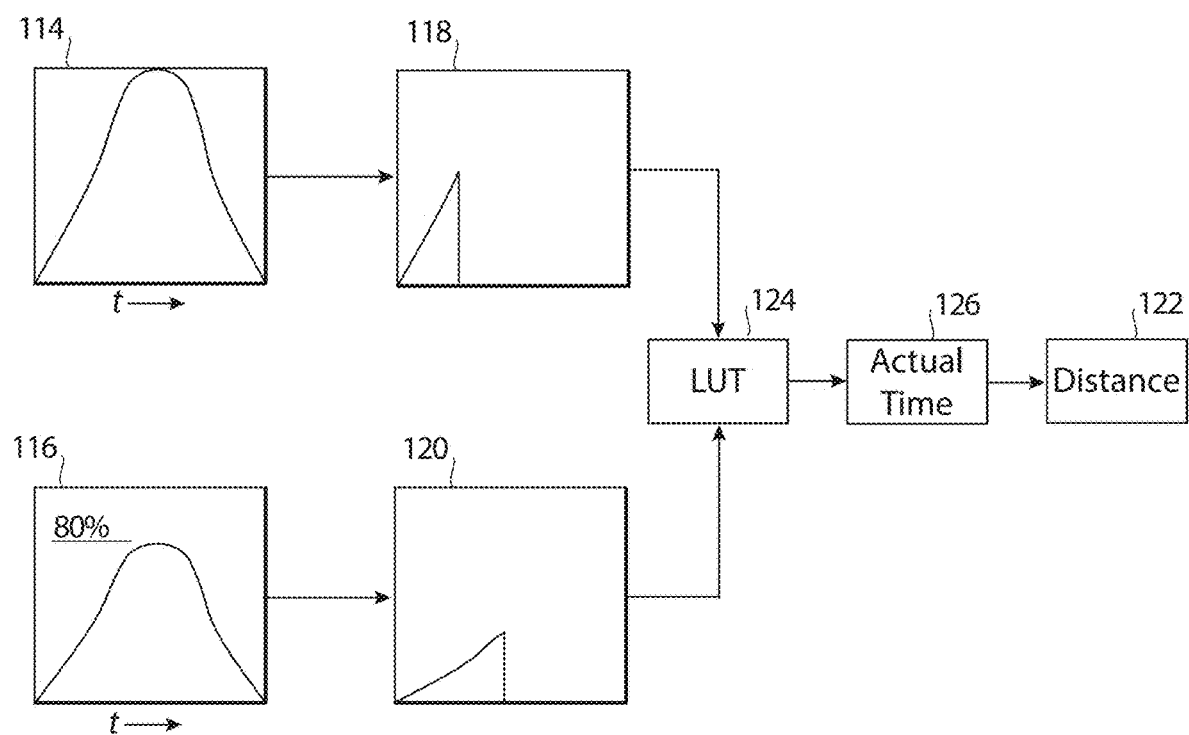
FIG. 2 is a diagram showing a method in accordance with the present disclosure, showing a process for using the system of FIG. 1.

With reference now to FIG. 2, a method 112 includes flashing an object with a first illumination pulse at a first illumination power level as indicated by box 114. The method 112 also includes flashing the object with a second illumination pulse at a second illumination power level lower than the first illumination power level, as indicated in FIG. 2 by box 116, and note that the pulses are represented as Gaussian temporal profile curves as a function of time, wherein the peak illumination power level in the second pulse (box 116) is at 80% of the peak power level in the first pulse (box 114). Those skilled in the art will readily appreciate that any other suitable ratio of power between the two pulses can be used without departing from the scope of this disclosure.

The method 112 includes at least partially integrating a first return pulse which is the first illumination plus returning from the object to determine a first return time, as indicated by the integral in box 118. The return pulse, which is the second illumination pulse returning from the object, can be similarly integrated (at least in part) to determine a second return time as indicated in box 120. Each of these integrations can involve integrating up to a predetermined threshold, e.g., where the same threshold is used for both pulses. The method includes using the first and second return times to determine distance to the object, as indicated in box 122, which is independent of reflectivity of the object.

Using the first and second return times to determine the distance to the object can include using a look up table (LUT) 124 to correlate the first and second return times to distance to the object. The LUT 124 can provide an actual time 126 to the object, i.e., the time a pulse would take to return from the object if the object had 100% reflectivity. This actual time 126 can be used to calculate the actual distance to the object regardless of the object's reflectivity. The LUT 124 can be limited to an operational space such as an operation space ranging from 5 meters to 10 meters, or any other suitable range for a given application.

Figure 3:
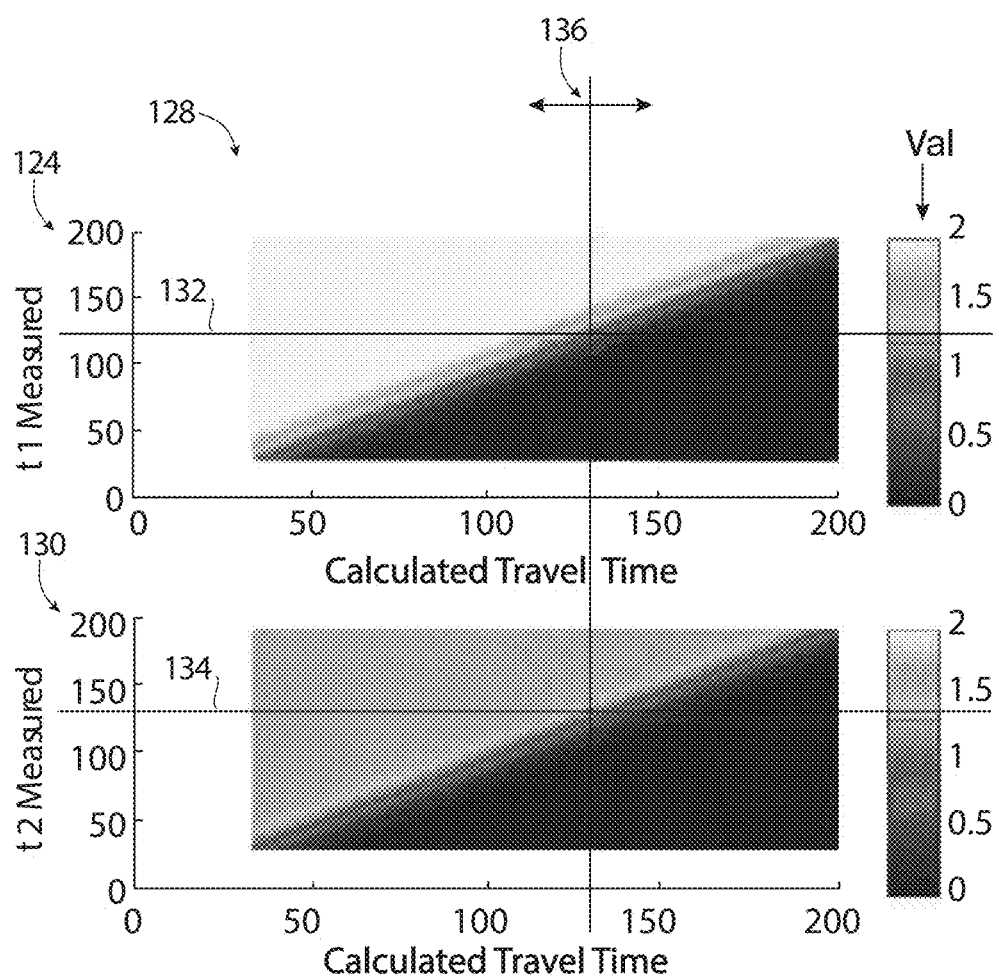
FIG. 3 is a diagram showing more detail about the LUT procedure shown in FIG. 2.

With reference now to FIG. 3, using the LUT can include using two sub-tables 128 and 130, one for each pulse. Each sub-table 128, 130 correlates respective measured travel times on the vertical axes to predetermined actual travel times. The actual travel times are located along the horizontal axes. The sub-tables 128 and 130 can be produced for Gaussian temporal profiles using the following equation, $$Va1 = 1 + \text{erf}(B^{0.5}(t_i - \Delta t))$$

Wherein Va1 is the sub-table value for a given combination of $t_i$ (measured or recorded travel time) and $\Delta t$, (actual travel time counted from the initial starting pulse centered at zero) wherein erf( ) refers to the Gaussian error function, and wherein B is given by the following equation, $$B = (4 \ln(2))/(w^2)$$

wherein w is full width at half-maximum for the given Gaussian temporal profile. Using the equation for calculating Va1 above, a two-dimensional array can be generated by varying the values for $t_i$ and $\Delta t$ over a range of values (corresponding to the desired operation range). This can be performed for the two different power levels used in the pulses to generate the two sub-tables 128 and 130.

To use the two sub-tables 128, 130, the method 112 of FIG. 2 takes as input the first and second measured return times. The respective row 132, 134 of each sub-table 128, 130 is analyzed (as indicated by the double arrow in FIG. 3) to determine a vertical location 136 along the rows 132, 134 where the table values (Va1 from the equation above) are as close as possible for the two sub-tables 128, 130. The vertical location 136 from either sub-table 128 or 130 is the calculated actual time for use in range finding. Using the LUT 124 allows a controller 108 (shown in FIG. 1) to avoid having to perform the error function, thus saving computational expense. Those skilled in the art will readily appreciate that other pulse shapes can be used without departing from the scope of this disclosure, wherein the LUT 124 is modified appropriately. The method can include updating distance to the object, e.g. by repeating the process shown in FIGS. 2-3. Those skilled in the art will readily appreciate that the LUT 124 and associated process can be used in imaging platforms where it is desirable to avoid requiring the hardware to perform the erf error function, however it is possible to simply use the erf if the hardware permits, without departing from the scope of this disclosure.

The methods and systems of the present disclosure, as described above and shown in the drawings, provide for range finding that is independent of surface reflectivity. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method comprising:
    flashing an object with a first illumination pulse at a first illumination power level;
    flashing the object with a second illumination pulse at a second illumination power level different from the first illumination power level;
    integrating at least a portion of a first return pulse which is the first illumination pulse returning from the object to determine a first return time;
    integrating at least a portion of a second return pulse which is the second illumination pulse returning from the object to determine a second return time; and
    using the first and second return times to determine distance to the object independent of reflectivity of the object;
    wherein using the first and second return times to determine the distance to the object includes using a look up table (LUT) to correlate the first and second return times to distance to the object, wherein the first and second return times are input to the LUT and wherein actual travel time and/or distance to the object is output from the LUT.

2. The method as recited in claim 1, wherein the LUT is limited to an operational space.

3. The method as recited in claim 2, wherein the LUT is limited to an operational space ranging from 5 meters to 10 meters.

4. The method as recited in claim 1, wherein the second illumination power level is 80% of the first illumination power level.

5. The method as recited in claim 1, wherein the first and second illumination pulses each conform to a Gaussian temporal profile.

6. The method as recited in claim 1, wherein using the LUT includes using two sub-tables, one for each pulse, wherein each sub-table correlates respective measured travel time to predetermined actual travel times, and wherein using the LUT includes locating predetermined actual travel times in each of the sub-tables that closest match each other, which actual travel time can be used for calculating actual distance to the object.

7. The method as recited in claim 1, further comprising updating distance to the object by repeating flashing the object with the first and second illumination sources, integrating the first and second return pulses, and determining distance to the object.

8. A system comprising:
an illuminator configured to flash a scene with two different levels of illumination power;
a sensor that is sensitive to illumination from the illuminator; and
a controller operatively connected to the illuminator and to the sensor, the controller being configured to use the sensor and the illuminator at two different levels of illumination power to find range to an object independent of reflectivity of the object;
wherein the controller includes machine readable instructions configured to cause the controller to:
use the illuminator to flash an object with a first illumination pulse at a first illumination power level;
use the illuminator to flash the object with a second illumination pulse at a second illumination power level lower than the first illumination power level;
use the sensor to integrate at least a portion of a first return pulse which is the first illumination plus returning from the object to determine a first return time;
use the sensor to integrate at least a portion of a second return pulse which is the second illumination pulse returning from the object to determine a second return time; and
use the first and second return times to determine distance to the object independent of reflectivity of the object, wherein using the first and second return times to determine the distance to the object includes using a look up table (LUT) to correlate the first and second return times to distance to the object, wherein the first and second return times are input to the LUT and wherein actual travel time and/or distance to the object is output from the LUT.

9. The system as recited in claim 8, wherein the LUT is limited to an operational space.

10. The system as recited in claim 9, wherein the LUT is limited to an operational space ranging from 5 meters to 10 meters.

11. The system as recited in claim 8, wherein the second illumination power level is 80% of the first illumination power level.

12. The system as recited in claim 8, wherein the first and second illumination pulses each conform to a Gaussian temporal profile.

13. The system as recited in claim 8, wherein using the LUT includes using two sub-tables, one for each pulse, wherein each sub-table correlates respective measured travel time to predetermined actual travel times, and wherein using the LUT includes locating predetermined actual travel times in each of the sub-tables that closest match each other, which actual travel time can be used for calculating actual distance to the object.

* * * * *